United States Patent [19]

Mihara et al.

[11] Patent Number: 5,896,287
[45] Date of Patent: Apr. 20, 1999

[54] BRIDGE-TYPE DIRECT CURRENT BOOST CONVERTER FOR DRIVING A CAPACITIVE LOAD

[75] Inventors: Masaaki Mihara, Chiba; Marco Cassis, Tokyo, both of Japan

[73] Assignee: STMicroelectronics, K.K., Tokyo, Japan

[21] Appl. No.: 09/046,939

[22] Filed: Mar. 23, 1998

Related U.S. Application Data

[63] Continuation-in-part of application No. 08/739,858, Oct. 30, 1996, abandoned.

[30] Foreign Application Priority Data

Oct. 30, 1995 [JP] Japan ................... 7-281497
Nov. 20, 1995 [JP] Japan ................... 7-301354

[51] Int. Cl.⁶ ........................................... H02M 7/5387
[52] U.S. Cl. .......................... 363/132; 323/225; 363/16
[58] Field of Search ........................ 363/15, 16, 17, 363/98, 132, 133, 134, 97; 323/222, 225

[56] References Cited

U.S. PATENT DOCUMENTS

| | | | |
|---|---|---|---|
| 4,208,869 | 6/1980 | Hanaoka | 368/84 |
| 4,527,096 | 7/1985 | Kindlmann | 315/169.3 |
| 4,633,141 | 12/1986 | Weber | 315/307 |
| 5,144,203 | 9/1992 | Fujita et al. | 315/169.3 |
| 5,313,141 | 5/1994 | Kimball | 315/169.3 |
| 5,349,269 | 9/1994 | Kimball | 315/169.3 |
| 5,379,209 | 1/1995 | Goff | 363/132 |
| 5,510,974 | 4/1996 | Gu et al. | 363/134 |
| 5,550,458 | 8/1996 | Farrington et al. | 323/222 |
| 5,642,273 | 6/1997 | Lai et al. | 363/98 |

FOREIGN PATENT DOCUMENTS

| | | |
|---|---|---|
| 2196805 | 5/1988 | United Kingdom. |
| WO 86/05304 | 9/1986 | WIPO. |

*Primary Examiner*—Peter S. Wong
*Assistant Examiner*—Y. J. Han
*Attorney, Agent, or Firm*—David V. Carlson; Seed and Berry LLP

[57] ABSTRACT

A direct current boost converter which has a simple structure using only one coil, and which can apply a driving voltage to a capacitive load which reciprocates in polarity is discussed. A first direct current branch circuit composed of first and second transistors is connected in parallel to a second direct current branch circuit composed of the third and fourth transistors. A coil is connected between the intermediate nodes of the transistors of these direct current branch circuits, and these nodes are further connected to both terminals of an EL panel through first and second diodes. The nodes between the first and second diodes and the EL panel are grounded through fifth and sixth transistors, respectively. A clock signal is applied to the first and third transistors, and a gate signal with an opposing phase is applied to the second and fourth transistors. Zener diodes can be connected in series to the switching circuits connected between the negative terminal of the DC power supply DC power supply and the side of the EL panel. Since these Zener diodes would be in parallel with respect to the EL panel, the flow of energy to the circuit board through the parasitic transistor structure of the Zener diodes is prevented. As a result, the loss of energy due to both electrical leaks and high-frequency spikes is eliminated.

22 Claims, 6 Drawing Sheets

BRIDGE-TYPE DIRECT CURRENT BOOST CONVERTER FOR DRIVING A CAPACITIVE LOAD

CROSS-REFERENCE TO PRIOR APPLICATION

This application is a continuation-in-part of U.S. patent application Ser. No. 08/739,858, filed Oct. 30, 1996, abandoned Mar. 23, 1998.

TECHNICAL FIELD

The present invention relates to direct current boost converters which drive capacitive loads such as electroluminescent panels, hereafter referred to as EL panels.

BACKGROUND OF THE INVENTION

Various types of these direct current boost converters are widely known, and they are divided into those using one coil and those using two coils.

Figures 1, 2A, 3:
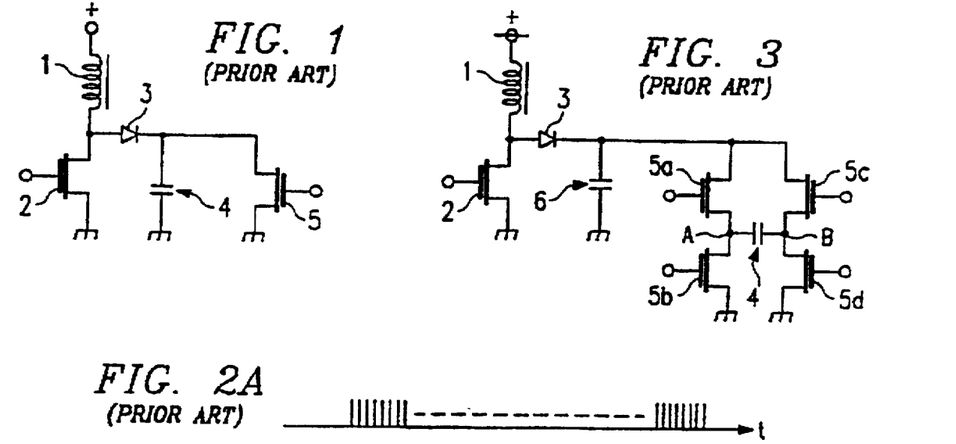
FIG. 1 is a circuit diagram which shows the structure of one example of a conventional direct current boost converter for driving EL panels.
FIGS. 2A–2C are signal waveform diagrams to explain the operation of the circuit shown in FIG. 1.
FIG. 3 is a circuit diagram which shows the structure of another example of a conventional direct current boost converter for driving EL panels.
Figure 2B:
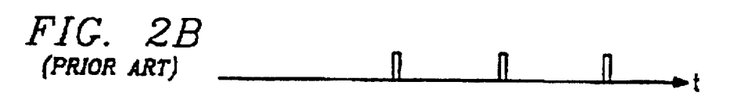

FIG. 1 shows an example of a conventional direct current boost converter using one coil. The coil (1) and the first transistor (2) are connected in series between the positive terminal and negative terminal (grounding terminal) of a DC power supply, and the node of this coil and the first transistor is connected through the diode (3) to the node of the EL panel (4) and the second transistor (5). The other terminal of this EL panel (4) and the second transistor (5) is connected to the negative terminal of the DC power supply. The clock signal shown in FIG. 2A is applied to the gate of the first transistor (2), and a gate signal with a repeating frequency which is lower than the clock signal shown in FIG. 2B is applied to the gate of the second transistor (5).

Figure 2C:
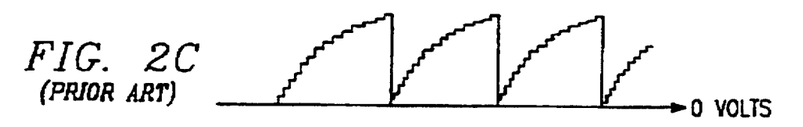

With respect to this example of a direct current boost converter, when a clock signal is applied to the gate of the first transistor (2) during the period in which the second transistor (5) is off, a voltage which gradually increases, as shown in FIG. 2C, is applied to the EL panel (4).

FIG. 3 shows another example of a conventional direct current boost converter using one coil, and this converter is described in the detailed explanations of U.S. Pat. Nos. 4,527,096 and 4,208,869. The coil (1) and first transistor (2) are connected in series between the positive terminal and negative terminal (grounding terminal) of the DC power supply, and that node is grounded through the diode (3) and the capacitor (6). The cathode of this diode (3) and a first plate of the capacitor (6) are connected to the switching bridge circuit which is composed of the second and third transistors (5a) and (5b), connected in series, and the fourth and fifth transistors (5c) and (5d), connected in series, and is connected between the node (A) of the EL panel (4) and the second and third transistors (5a) and (5b), and the node (B) of the fourth and fifth transistors (5c) and (5d).

Figure 4A:
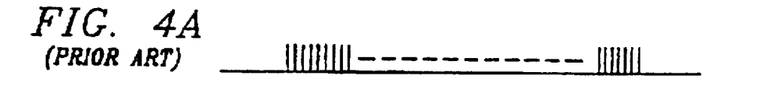
FIGS. 4A–4E are signal waveform diagrams to explain the operation of the circuit shown in FIG. 3.
Figure 4B:
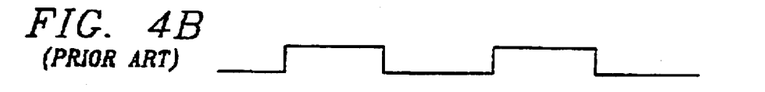
Figure 4C:
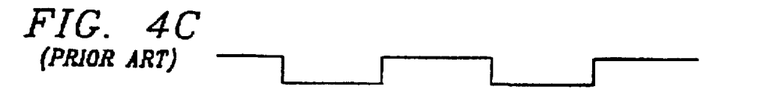
Figure 4D:
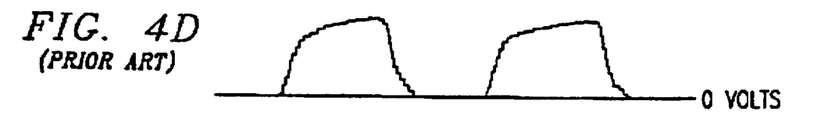
Figure 4E:
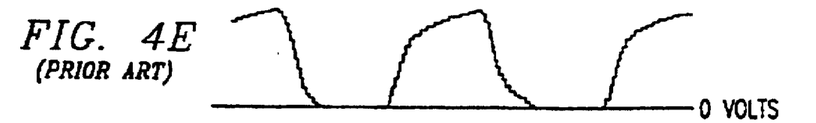

The clock signal shown in FIG. 4A is applied to the gate of the first transistor (2), and the gate signal shown in FIG. 4B is applied to the gates of the second and fifth transistors (5a) and (5d), and the second gate signal having the opposite phase to the first gate signal, as shown in FIG. 4C, is applied to the gates of the third and fourth transistors (5b) and (5c). Therefore, the second and fifth transistors (5a) and (5d) go on simultaneously, and then the third and fourth transistors (5b) and (5c) go on simultaneously. As a result, a boosted voltage is applied to the nodes (A) and (B) as shown in FIGS. 4D and E.

Figure 5:
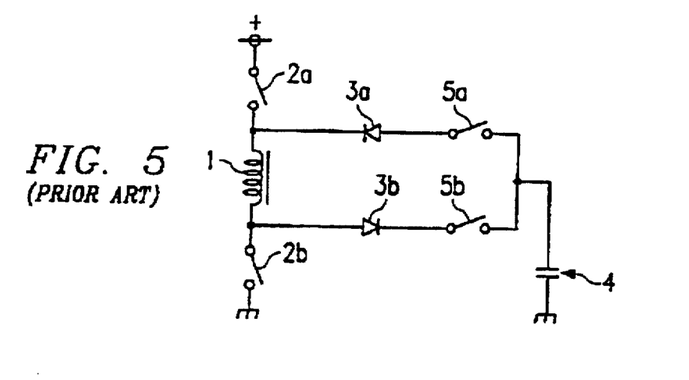
FIG. 5 is a circuit diagram which shows the structure of another example of a conventional direct current boost converter for driving EL panels.

FIG. 5 shows another example of a conventional direct current boost converter using one coil, and this is described in the detailed explanation of U.S. Pat. No. 5,313,141. The coil (1) and series circuit of the first and second switching elements (2a) and (2b) is connected between the positive and negative terminals of the DC power supply, and the node between the first switching element (2a) and the coil (1) is connected to the cathode of the first diode (3a), while its anode is connected to the third switching element (5a), the node of the second switching element (2b) and the coil (1) is connected to the anode of the second diode (3b), while its cathode is connected to the fourth switching element (5b), these third and fourth switching elements are connected to one terminal of the EL panel (4), and the other terminal of the EL panel is grounded.

Figure 6A:
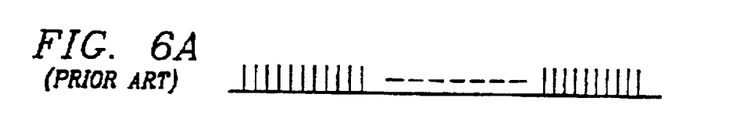
FIGS. 6A–6D are signal waveform diagrams to explain the operation of the circuit shown in FIG. 5.
Figure 6B:
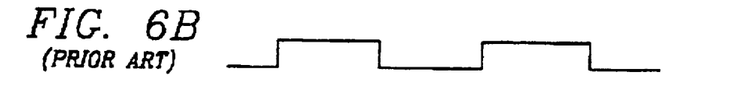
Figure 6C:
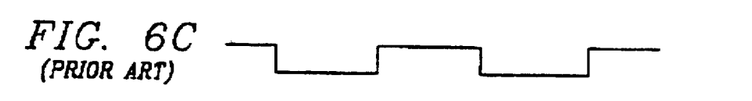
Figure 6D:
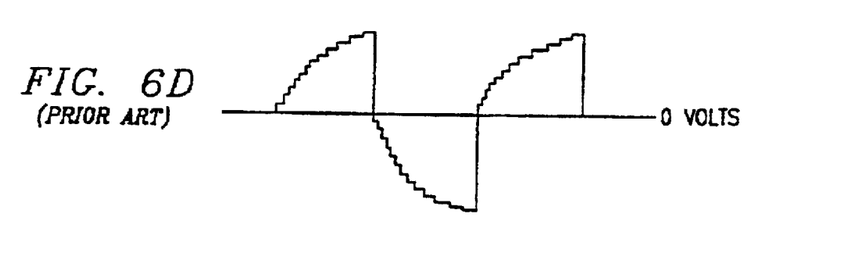

A clock signal as shown in FIG. 6A is applied to the first and second switching elements (2a) and (2b), and the first and second gate signals which have the opposite phase to one another, as shown in FIG. 6B and C, are applied to the third and fourth switching elements (5a) and (5b). As a result, a boosted voltage is applied between the two terminals of the EL panel (4) as shown in FIG. 6D.

Figure 7:
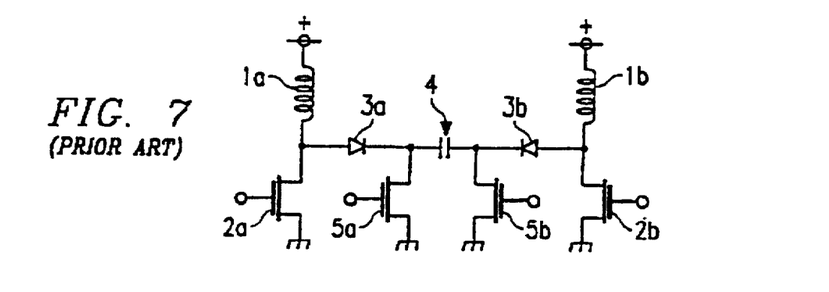
FIG. 7 is a circuit diagram which shows the structure of another example of a conventional direct current boost converter for driving EL panels.

FIG. 7 shows an example of a conventional direct current boost converter using two coils, and this is described in the detailed explanation of U.S. Pat. No. 5,349,269. The series circuit of the first coil (1a) and the first transistor (2a) is connected between the positive and negative terminals of a DC power supply, and the node of this coil and transistor is connected to one terminal of the EL panel (4) through the first diode (3a). The node between the first diode (3a) and one terminal of the EL panel (4) is grounded through the second transistor (5A). Also, the series circuit between the second coil (1b) and the third transistor (2b) is connected between the positive and negative terminals of a DC power supply, and the node between this coil and transistor is connected to the other terminal of the EL panel (4) through the second diode (3b). The node between the second diode (3b) and the other terminal of the EL panel (4) is grounded through the fourth transistor (5b).

Figure 8A:
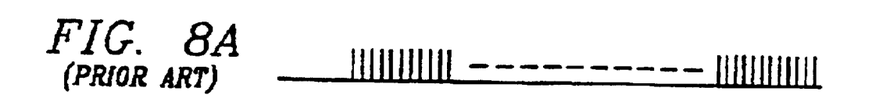
FIGS. 8A–8E are signal waveform diagrams to explain the operation of the circuit shown in FIG. 7.
Figure 8B:
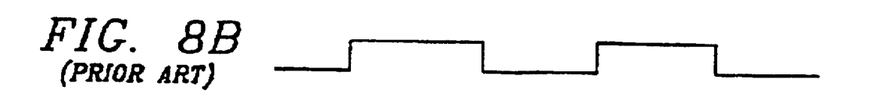
Figure 8C:
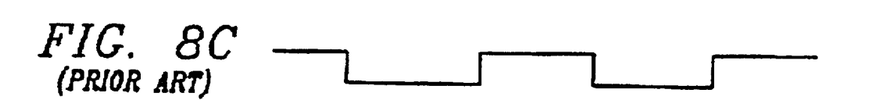
Figure 8D:
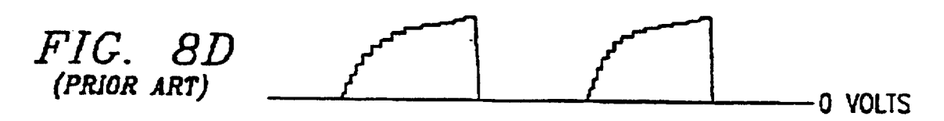
Figure 8E:
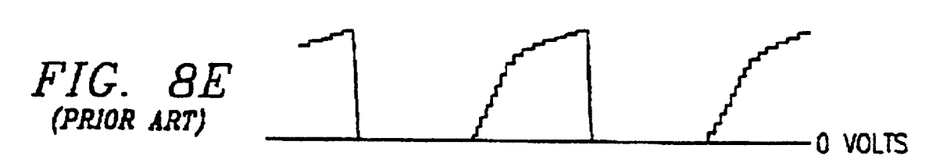

The clock signal shown in FIG. 8A is applied to the gates of the first and third transistors (2a) and (2b), and the first and second gate signals of opposite phase to one another are applied to the gates of the second and fourth transistors (5a) and (5b). As a result, a boosted voltage is applied between the two terminals of the EL panel (4) as shown in FIGS. 8D and 8E.

With respect to the conventional direct current boost converter shown in FIG. 1, although the structure is simple because it only requires a single coil, its weakness is that the voltage which is applied to the EL panel (4) is of single polarity, and the efficiency of light-emission is low.

With the conventional direct current boost converter shown in FIG. 3, one coil is sufficient as well, and although it has the advantage that in addition to the structure being simple, a voltage of alternating polarity is applied to the EL panel (4), making the efficiency of light emission high, because the capacitor (6) is charged with a driving voltage, when the driving voltage becomes high, it requires a capacitor with a high resistance to voltage, and its weakness is its size and cost.

With the conventional direct current boost converter shown in FIG. 5, one coil is sufficient as well, and since a voltage of dual polarity is applied to the EL panel (4) it has the advantage that the efficiency of light emission is high, but when the transistors which compose the switching elements (5a) and (5b) are composed of integrated circuits, a negative voltage is applied to a semiconductor substrate, so there is the need to construct it to prevent the flow of electricity into the semiconductor substrate, which makes the structure of the integrated circuit complex, resulting in the weakness of high cost.

With the conventional direct current boost converter shown in FIG. 7, because the voltage which is applied to the EL panel (4) alternates in polarity, the efficiency of light emission is high; however, since it requires two coils (1a) and (1b), it has the weakness of complex structure and high cost.

Figure 9:
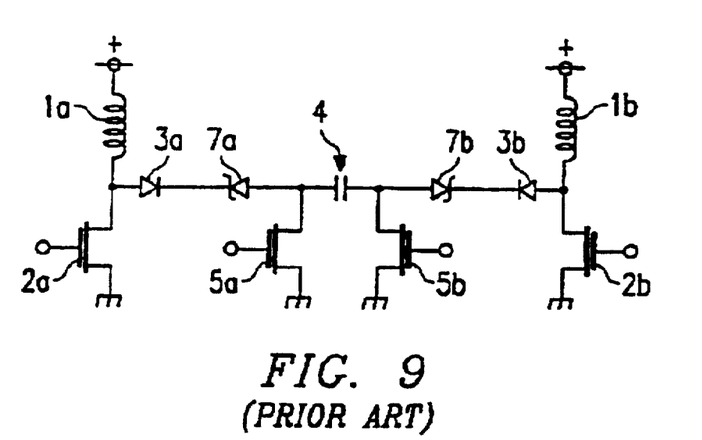
FIG. 9 is a circuit diagram that shows the structure of one example of an existing direct-current boost converter for driving an EL panel.

The type of drive circuit described above is well known from, for example, the detailed explanation of U.S. Pat. No. 5,349,269, and its structure is shown in FIG. 9. As shown in FIG. 9, the series circuit of the first coil (1a) and the first transistor (2a) is connected between the positive and negative terminals of the DC power supply, and the connection point between this coil and transistor is joined to one terminal of the EL panel (4) by way of the first diode (3a) and the first Zener diode (7a). The connection point between the first Zener diode (7a) and one terminal of the EL panel (4) is grounded through the second transistor (5a). Also, the series circuit of the second coil (1b) and the third transistor (2b) is connected between the positive and negative terminals of the DC power supply, and the connection point between this coil and transistor is joined to the other terminal of the EL panel (4) through the second diode (3b) and the second Zener diode (7b). The connection point between the second Zener diode (7b) and the other terminal of the EL panel (4) is grounded through the fourth transistor (5b).

A clock signal is applied to the gate of the first and third transistors (2a) and (2b), and gate signals that have opposite phases from one another are applied to the gates of the second and fourth transistors (5a) and (5b). As a result, a boosted voltage is applied between the terminals one and two of the EL panel (4).

With the widely known drive circuit described above, because the first and second Zener diodes (7a) and (7b) are connected to the current path between the first coil (1a) and the EL panel (4) and the current path between the second coil (1b) and the EL panel (4), these Zener diodes (7a) and (7b) serve the purpose of preventing electrical leaks from the DC power supply. Consequently, when the second transistor (5a) is in a conductive state, the path through the positive terminal of the DC power supply, the first coil (1a), the first diode (3a), the second transistor (5a), and the negative terminal is broken by the Zener diode (7a). When the fourth transistor (5b) is in a conductive state, the path through the positive terminal of the DC power supply, the second coil (1b), the first diode (3b), the fourth transistor (5b), and the negative terminal is broken by the Zener diode (7b). As a result, through the action of these Zener diodes to prevent electrical leaks, the effect of greatly reducing the loss of energy is achieved.

However, when the above drive circuit is built into an IC substrate, a parasitic transistor is formed in the structure of the Zener diode between it and said IC substrate, and a high-speed, in other words a high-frequency, spike flows into the substrate side through this parasitic transistor, and eventually flows to a ground, with a resulting a loss of energy. When this type of energy loss occurs, the benefit of placing a Zener diode cannot be realized.

SUMMARY OF THE INVENTION

A purpose of this invention is to present a drive circuit that will resolve the weaknesses described above, making it possible to greatly reduce the loss of energy, and enable the EL panel to produce a bright light over long periods of time.

A preferred embodiment of the present invention provides a direct current boost converter for driving a capacitive load. The converter includes first and second direct current branch circuits connected between the positive and negative terminals of a DC power supply. The first branch circuit has a first switching element driven by a first clock signal and a second switching element driven by a first gate signal having a higher frequency than the first clock signal and a duty ratio of 50%. The second branch circuit has a third switching element driven by a second clock signal and a fourth switching element driven by a second gate signal having the opposite phase of the first clock signal. A coil is connected between a first intermediate node located between the first and second switching elements of the first branch circuit and a second intermediate node located between the third and fourth switching elements of the second branch circuit. A first diode is connected between the first node and one terminal of the capacitive load. A second diode is connected between the second node and the other terminal of the capacitive load. A fifth switching element is connected between a third node located between the first diode and one terminal of the capacitive load, and the negative terminal of the DC power supply. The fifth switching element is driven by the same gate signal as the first gate signal applied to the second switching element. A sixth switching element is connected between a fourth node located between the second diode and the other terminal of the capacitive load, and the negative terminal of the direct current electrical load. The sixth switching element is driven by the same gate signal as the second gate signal applied to the fourth switching element.

Another preferred embodiment of the present invention provides a drive circuit for a capacitive load. The drive circuit includes a first and a second serial branch circuit connected between the positive and negative terminals of a DC power supply. The first serial branch circuit includes a first coil and a first switching element driven by a clock signal. The second serial branch circuit includes a second coil and a second switching element driven by the above clock signal. A first diode is joined between the connection point of the first coil and the first switching element of the above first serial branch circuit, and one terminal of the capacitive load. A second diode is joined between the connection point of the second coil and the second switching element of the above second serial branch circuit, and the other terminal of the above capacitive load. A third serial branch circuit having a first Zener diode and a third switching element is joined between the connection point of the above first diode and the capacitive load and the negative terminal of the above DC power supply. The first Zener diode has a threshold value larger than the source voltage of the DC power supply. The third switching element is driven by a first gate signal having a duty ratio of 50%. A fourth serial branch circuit having a second Zener diode and a fourth switching element is connected between the above second diode and the capacitive load. The second Zener diode has a threshold value greater than the source voltage of the DC power supply. The fourth switching element is driven by a second gate signal having the opposite phase to the above first gate signal.

In this invention, Zener diodes may be connected in parallel with respect to the capacitive load. The Zener diodes may be connected in parallel, along with the capacitive load, in an integrated circuit. Consequently, even if a high-frequency spike is produced by the electrical source, the spike takes on an integrated form. As a result, even if a drive circuit is formed on an IC substrate, it is prevented from flowing into the substrate through the parasitic transistor of the Zener diode. At the same time, since the Zener diodes are connected in series to the switching paths connected between the two terminals of the capacitive load and the negative terminal of the DC power supply, the path from the electrical source to the negative terminal by way of these switching paths is broken by the Zener diodes, and electrical leaks are prevented. As a result, even when a drive circuit is formed onto an IC substrate, it is possible to eliminate both the loss of energy from electrical leaks and the loss of energy from high-frequency spikes, making it possible to greatly increase the life of the DC power supply.

The load which is driven by this invention may be one of various kinds of capacitive loads, but it is especially ideal for it to be a electric field light-emitting element.

DETAILED DESCRIPTION OF THE INVENTION

Figure 10:
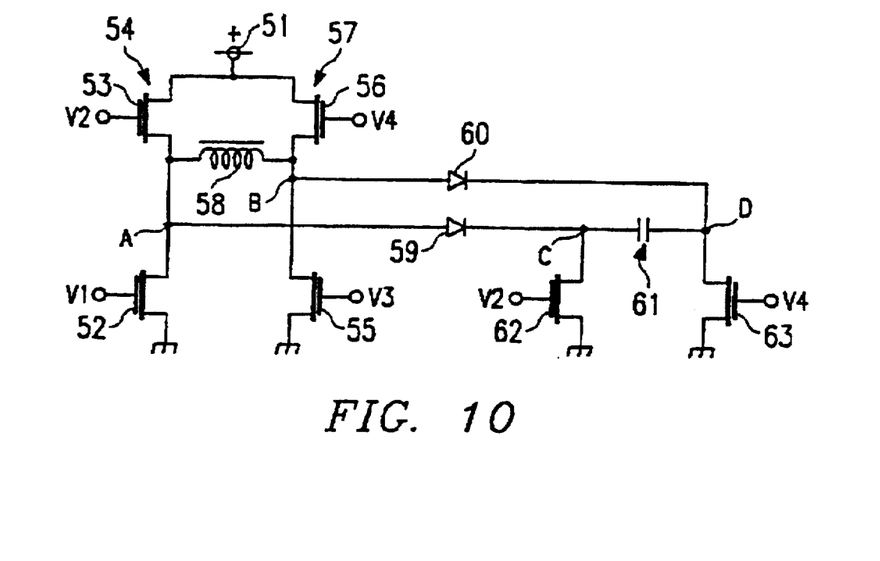
FIG. 10 is a circuit diagram which shows the structure of one application example of the direct current boost converter for driving EL panels according to this invention.

FIG. 10 is a circuit diagram which shows the structure of one application example of the direct current boost converter of this invention. The first serial branch circuit (54), in which the first and second switching transistors (52) and (53) are connected in series between the positive terminal (51) and the grounded negative terminal of the DC power supply, is connected in parallel to the second serial branch circuit (57), in which the third and fourth switching transistors (55) and (56) are connected in series. The coil (58) is connected between the node (A) between the first and second switching transistors (52) and (53) of the first serial branch circuit (54), and the node (B) between the third and fourth switching transistors (55) and (56) of the second direct current branch circuit (57).

In addition, the above node (A) is connected to one terminal of the EL panel (61) by way of the first diode (59), and the node (B) is connected to the other terminal of the EL panel through the second diode (60). The node (C) between the cathode of the first diode (59) and one terminal of the EL panel (61) is grounded through the fifth switching transistor, and the node (D) between the cathode of the second diode (60) and the other terminal of the EL panel (61) is grounded through the sixth switching transistor (63).

Figure 11A:
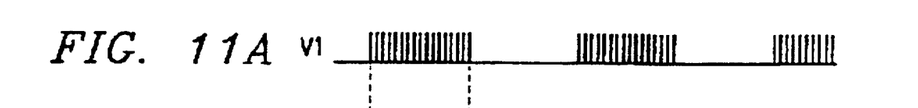
FIGS. 11A–11F are signal waveform diagrams to explain the operation of the drive circuit shown in FIG. 10.

FIG. 11A shows the clock signal (V1) which is applied to the gate of the first switching transistor (52) of the first direct current branch circuit (54), and in this example the amplitude is set to 5 V, the repeating frequency is set to 8 KHz, and the duty cycle is set to 75%. Also, the voltage of the DC power supply is set at 3 V.

Figure 11B:
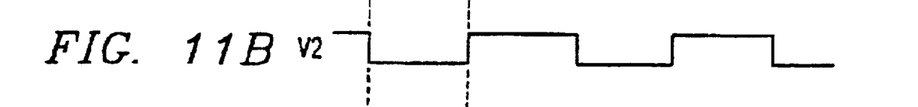

FIG. 11B shows the gate signal (V2) which is applied to the gate of the second switching transistor (53), where the amplitude is set to 5 V, and the repeating frequency is set to 512 Hz.

Figure 11C:
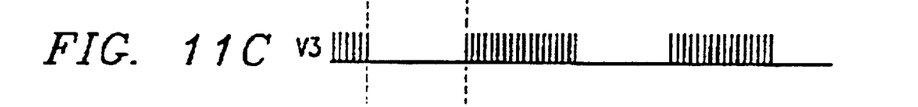
Figures 11D, 11E:
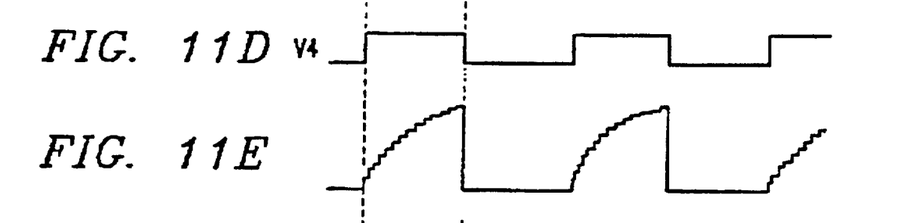

FIG. 11C shows the clock signal which is applied to the gate of the third switching transistor (55) of the second direct current branch circuit (57). FIG. 11D shows the gate signal which is applied to the gate of the fourth switching transistor (56) of the second direct current branch circuit (57), and its phase is the opposite of the gate signal which is shown in FIG. 10B above. The first gate signal has a lower frequency than the first clock signal and a duty ratio of 50%.

Also, a gate signal, which is the same as the gate signal (V2) which is applied to the gate of the second switching transistor (53) mentioned above, is applied to the gate of the fifth switching transistor (62), and a gate signal, which is the same as the gate signal (V4) which is applied to the gate of the fourth switching transistor (56) mentioned above, is applied to the gate of the sixth switching transistor (63).

Now, at time $t_n$, the first clock signal (V1) is applied to the gate of the first switching transistor (52) of the first direct current branch circuit (54), and due to the first gate signal (V2) which is applied to the gate of the second switching transistor (53), the second switching transistor (53) is off. In this case the third switching transistor (55) of the second direct current branch circuit (57) is off, but the fourth switching transistor (56) is on, and while the fifth switching transistor (62) is off, the sixth switching transistor (63) is on. Consequently, the voltage at node (A) gradually increases, as shown in FIG. 11E, and this is applied to the EL panel (61). In this case, the potential of node (D) is zero, but the voltage of node (C) becomes positive. In this case the maximum value of the driving voltage is 120 V.

Figure 11F:
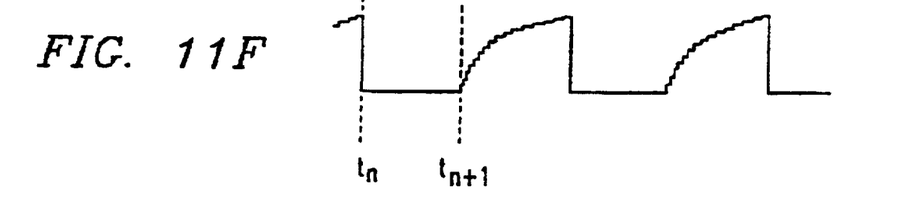

Next, at time $t_{n+1}$, the first gate signal (V2) which is applied to the gate of the second switching transistor (53) of the first direct current branch circuit (54) reaches a high level and this transistor goes on, and as the second clock signal (V3) is applied to the third switching transistor (55) of the second direct current branch circuit (57), both the first switching transistor (52) of the first direct current branch circuit (54) and the fourth switching transistor (56) of the second direct current branch circuit (57) turn off, and in addition, the fifth switching transistor (62) turns on, and the sixth switching transistor (63) turns off. In this state, the voltage of node (B) gradually increases to 120 V as shown in FIG. 11F, and this is applied to the EL panel (61). In this case, since the fifth switching transistor (62) is on, the node (C) has an potential of zero, and the voltage of the node (D) is positive.

As described above, with this example of a direct current boost converter, since a driving voltage which alternates in polarity is applied to the EL panel (61), which is a capacitive load, the efficiency of light emission of the EL panel is high, and it is possible for the EL panel to emit light using a low direct current voltage for long periods of time. Also, since only one coil (58) is used, the structure is simple, and it is possible to keep costs low.

This invention is not limited to the application example described above, and many changes and variations are possible. For example, with the above example, MOS-type field effect transistors were used as the switching elements, but it is also possible to use bipolar transistors. Furthermore, an EL panel was driven as the capacitive load in the application example described above, but it is possible to drive other capacitive loads as well. In addition, the gate signals V2, V4 are shown as having 50% duty cycles, but a broad range of duty cycles could be employed, such as 40% to 60%.

Figure 12:
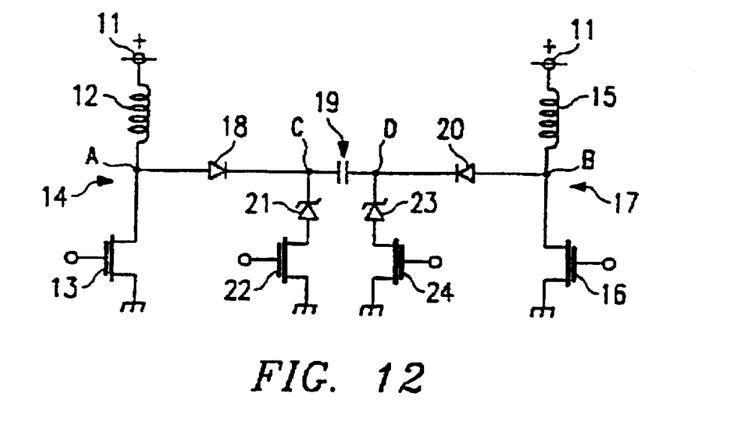
FIG. 12 is a circuit diagram which shows the structure of a drive circuit for a capacitive load according to this invention.

FIG. 12 is a circuit diagram showing the structure of one preferred embodiment of the drive circuit for a capacitive load according to this invention. The first serial branch circuit (14), in which the first coil (12) and the first switching transistor (13) are connected in series, is connected between the positive terminal (11) of the DC power supply and the grounded negative terminal. In the same way, the second serial branch circuit (17), in which the second coil (15) and the second switching transistor (16) are connected in series, is connected between the positive terminal (11) of the DC power supply and the negative terminal. The connection point (A) of the first coil (12) and the first switching transistor (13) of the first serial branch circuit (14) is joined to one terminal of the EL panel (19) through the first diode (18). The connection point (B) of the second coil (15) and the second switching transistor (16) of the second serial branch circuit (17) is joined to the other terminal of the EL panel (19) through the second diode (20). The connection point (C) between the cathode of the first diode (18) and the EL panel (19) is grounded through the first Zener diode (21), which is a constant-voltage element, and the third switching transistor (22). The connection point (D) between the cathode of the second diode (20) and the EL panel (19) is grounded through the second Zener diode (23) and the fourth switching transistor (24). The cathodes of these first and second Zener diodes (21) and (23) are connected in the direction of the EL panel, and their threshold voltage is made higher than that of the source voltage of the DC power supply.

Figure 13A:
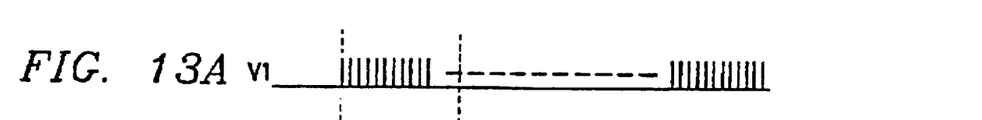
FIGS. 13A–13E are signal waveform diagrams for explaining the operation of the drive circuit shown in FIG. 12.

FIG. 13A shows the clock signal (V1) applied to the gates of the first and second switching transistors.

Figure 13B:
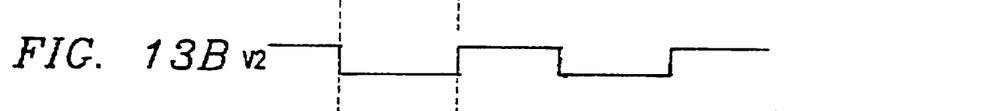

FIG. 13B shows the gate signal (V2) applied to the gate of the fourth switching transistor. The gate signal (V2) has a duty ratio of 50%.

Figure 13C:
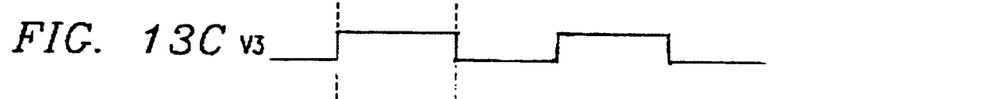

FIG. 13C shows the gate signal (V3), which is in the opposite phase of the gate signal in FIG. 13B, applied to the gate of the third switching transistor.

Figure 13D:
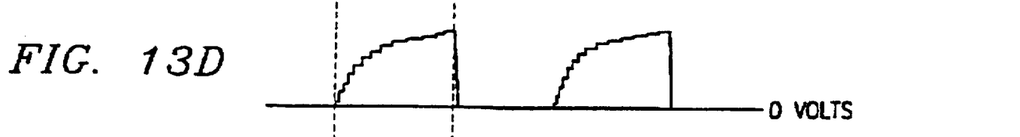
Figure 13E:
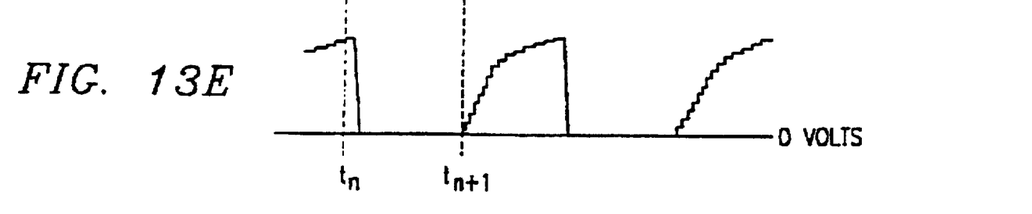

FIGS. 13D and 13E show the voltage at connection points (C) and (D) with respect to the applied gate signals (V1) and (V2), respectively.

At time $t_n$, clock signal (V1) is applied to the gate of the switching transistor (13) of the first serial branch circuit (14), and the gate signal (V2) is applied to the gate of the third switching transistor (22), and they go into the off position. As the gate signal (V3) is applied to the gate of the fourth switching transistor (24), it goes into the on position. In this case, the voltage at connection point (C) gradually increases as shown in FIG. 13D, and this is applied to the EL panel (19). In this case, the voltage at connection point (D) is roughly zero, and at connection point (C) it is positive, approximately 120 V. It will be appreciated that the voltage at connection point (D) will be effectively ground compared to the large voltage at connection point (C), but the actual voltage and connection point (D) will be approximately 5–10 V because of the voltage drop across the second Zener diode 23.

Next, the fourth switching transistor (24) goes into the off position and the third switching transistor (22) goes into the on position at time $t_{n+1}$. In this state, the voltage at connection point (D) gradually increases to 120 V, as shown in FIG. 13E, and this boosted voltage is applied to the EL panel (19). In this case, the connection point (C) is roughly at zero, but the voltage at connection point (D) is positive. Once again, the connection point (C) is effectively grounded compared to the 120 V at connection point D, but the actual voltage at the connection point (C) will be approximately 5–10 V. As a result, since a drive voltage that reciprocates in polarity is applied to the EL panel (19), the efficiency of light emission of the EL panel is high. It should also be appreciated that the voltage at connection points (C) and (D) can reach 90 to 600 V, with 120 V being a typical value.

Now the prevention of electrical leaks will be explained. The third switching transistor (22) is in the off position, and the fourth switching transistor (24) is in the on position. In the case of the widely known drive circuit shown in FIG. 9, when looked at from the electrical source side. Since the Zener diodes are connected to the EL panel in series, when a high-frequency spike, in other words high-speed energy, is supplied in the direction of the EL panel from the electrical source, the energy flows into the circuit board through the parasitic transistor peculiar to the Zener diode, causing a loss of energy. In contrast, with the drive circuit shown in FIG. 12, since the Zener diode (21) is in a parallel position with respect to the EL panel (19), a type of integrated circuit is formed. Consequently, the high-frequency spike takes on an integrated form; as a result, it is prevented from flowing into the circuit board through the parasitic transistor.

Also, the path through the positive terminal (11), the second coil (15), connection point (B), the second diode (20), connection point (D), the second Zener diode (23), and the fourth switching transistor (24) is cut off from the low voltage current from the DC power supply by the Zener diode (23), preventing electrical leaks through this path.

Figure 14:
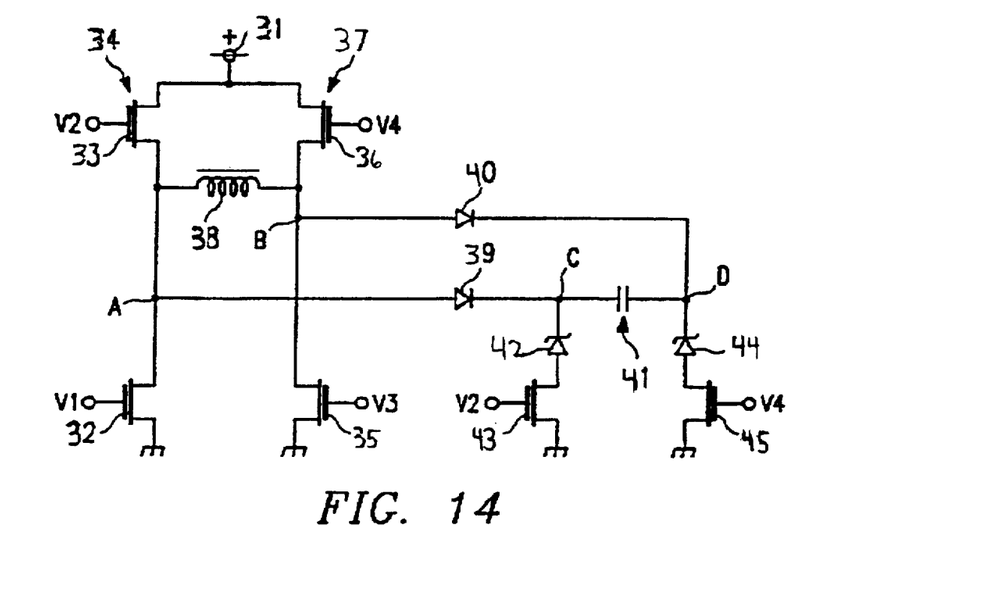
FIG. 14 is a circuit diagram that shows the structure of a variation of the drive circuit for driving the EL panel according to this invention.

FIG. 14 is a circuit diagram that shows the structure of a second preferred embodiment of the drive circuit according to this invention. The first serial branch circuit (34), in which the first and second switching transistors (32) and (33) are connected in series, is connected in parallel to the second serial branch circuit (37), in which the third and fourth switching transistors (35) and (36) are connected in series. The first and second serial branch circuits 34, 37 are each connected between a ground terminal and a positive terminal (31) of a DC power supply. The coil (38) is joined between connection point (A) of the first and second switching transistors (32) and (33) of the first serial branch circuit (34) and connection point (B) of the third and fourth switching transistors (35) and (36) of the second serial branch circuit (37).

Furthermore, the above connection point (A) is joined to one terminal of the EL panel (41) through the first diode (39), and connection point (B) is joined to the other terminal of the EL panel through the second diode (40). The connection point (C) of the cathode of the first diode (39) and one terminal of the EL panel (41) is effectively grounded through the first Zener diode (42) and the fifth switching transistor (43) when the fifth switching transistor is on. The connection point (D) of the cathode of the second diode (40) and the other terminal of the EL panel (41) is effectively grounded through the second Zener diode (44) and the sixth switching transistor (45) when the sixth switching transistor is on.

Figure 15A:
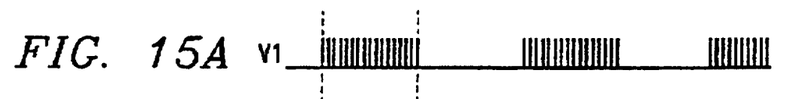
FIGS. 15A–15F are signal waveform diagrams for explaining the operation of the drive circuit shown in FIG. 14.

FIG. 15A shows the clock signal (V1) applied to the gate of the first switching transistor (32) of the first direct-current branch circuit (34); in this example, its amplitude is 5 V, the repetition frequency is 8 KHz, and the duty cycle is 75%. Also, the voltage of the DC power supply is 3 V.

Figure 15B:
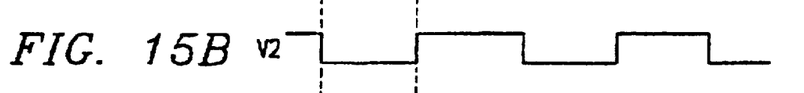

FIG. 15B shows the first gate signal (V2) applied to the gate of the second and fifth switching transistors (33) and (43), where its amplitude is 5 V, and its repetition frequency is 512 Hz. The first gate signal (V2) has a duty ratio of 50%.

Figure 15C:
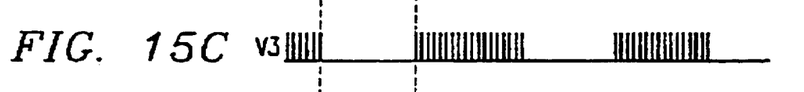

FIG. 15C shows the clock signal applied to the gate of the third switching transistor (35) of the second direct-current branch circuit (37).

Figure 15D:
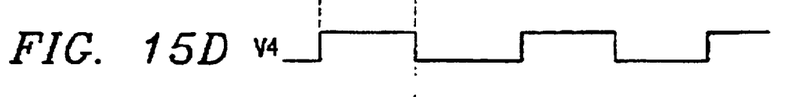

FIG. 15D shows the gate signal applied to the gate of the fourth and sixth switching transistors (36) and (45); its phase is the opposite of the gate signal shown in FIG. 15B.

Figure 15E:
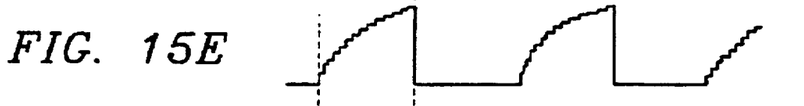
Figure 15F:
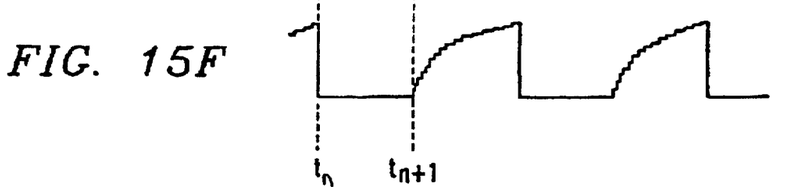

FIGS. 15E and 15F show the voltage at connection points (A) and (B) with respect to the applied gate signals (V1) and (V2), respectively.

As described above with reference to FIG. 15B, the same gate signal (V2) applied to the gate of the second switching transistor (33) is applied to the gate of the fifth switching transistor (42). Further, the same gate signal (V4) applied to the gate of the fourth switching transistor (36) described above, is applied to the gate of the sixth switching transistor (45).

At time $t_n$, the first clock signal (V1) is applied to the gate of the first switching transistor (32) of the first direct-current branch circuit (34), and the second switching transistor (33) goes into the off position because of the first gate signal (V2) applied to the second switching transistor (33). In this case, the third switching transistor (35) of the second direct-current branch circuit (37) is in the off position, but the fourth switching transistor (36) is in the on position. Additionally, the fifth switching transistor (43) is in the off position and the sixth switching transistor (45) is in the on position. As a result, the voltage at connection point (A) after time $t_n$ gradually increases as shown in FIG. 15E to 90–600 V with 120 V being typical. This is applied to the EL panel (41). Further, the electrical potential at connection point (D) is effectively zero, but the voltage at connection point (C) will be positive. The actual voltage at the connection point (D) will be approximately 5–10 V because of the voltage across the second Zener diode 44. In this state a typical value of the drive voltage is 120 V.

Next, at time $t_{n+1}$, the first gate signal (V2) applied to the gate of the second switching transistor (33) of the first direct-current branch circuit (34) rises to a high level. Switching transistor (33) goes on, and in a condition where the second clock signal (V3) is applied to the gate of the third switching transistor (35) of the second direct-current branch circuit (37), the first switching transistor (32) of the first direct-current branch circuit (34) and the fourth switching transistor (36) of the second direct-current branch circuit (37) both go into the off position. In addition, the fifth switching transistor (43) turns on, while the sixth switching transistor (45) turns off. In this state, the voltage at connection point (B) will gradually increase to 120 V as shown in FIG. 15F; this is applied to the EL panel (41). In this case, since the fifth switching transistor (43) is in the on position, the electrical potential at connection point (C) is zero, but the voltage at connection point (D) is positive. Once again, the voltage at connection point (C) actually will be approximately 5–10, which is effectively zero compared to the 120 V at connection pont (D).

With the drive circuit of this example as described above, it is possible for electrical leaks to be effectively prevented by the first and second Zener diodes connected in parallel with respect to the EL panel (41). In fact, since a drive voltage that reciprocates in polarity is applied to the EL panel (41), which is a capacitive load, the efficiency of light emission is high. Even with a low direct-current source voltage, it is possible for the EL panel to produce a bright light over long periods of time. Also, since only one coil is used, the structure of the EL panel is simple, and it is possible to keep costs low.

This invention need not be limited to the application example described above, and many variations and changes are possible. For example, with the above application example, a MOS-type field effect transistor was used as the switching element, but a bipolar transistor may also be used. Furthermore, with the above application example, an EL panel was driven as the capacitive load, but other capacitive loads may also be driven.

With the invention as described above, since Zener diodes are connected in series to the switching circuits connected to both sides of the capacitive load, it is possible to eliminate both the electrical leaks that flow through these circuits and the energy loss that flows into the IC circuit board through the parasitic transistor structure.

We claim:

1. A direct current boost converter for driving a capacitive load having first and second terminals, the direct current boost converter comprising:

a first direct current branch circuit connected between positive and negative terminals of a DC power supply, the first direct current branch circuit including a first switching element driven by a first clock signal and a second switching element driven by a first gate signal having a lower frequency than the first clock signal, the first and second switching elements being connected to each other at a first node;

a second direct current branch circuit connected between the positive and negative terminals of the DC power supply, the second direct current branch circuit including a third switching element driven by a second clock signal, and a fourth switching element which is driven by a second gate signal having an opposite phase of the first gate signal, the third and fourth switching elements being connected to each other at a second node;

a coil connected between the first node and the second node;

a first diode connected between the first node and the first terminal of the capacitive load;

a second diode connected between the second node and the second terminal of the capacitive load;

a fifth switching element connected between the first terminal of the capacitive load and the negative terminal of the DC power supply, and which is driven by the first gate signal; and a sixth switching element which is connected between the second terminal of the capacitive load and the negative terminal of the DC power supply and which is driven by the second gate signal.

2. The direct current boost converter of claim 1 wherein capacitive load is an electric field light-emitting element.

3. A drive circuit for a capacitive load, comprising:

a first serial branch circuit connected between positive and negative terminals of a DC power supply, said first serial branch circuit having a first coil and a first switching element driven by a clock signal, the first coil being connected to the first switching element at a first connection point;

a second serial branch circuit connected between the positive and negative terminals of the DC power supply, said second branch circuit having a second coil and a second switching element driven by the clock signal, the second coil being connected to the second switching element at a second connection point;

a first diode coupled between the first connection point and a first terminal of the capacitive load;

a second diode coupled between a second connection point and a second terminal of the capacitive load;

a third serial branch circuit having a first Zener diode and a third switching element coupled in series between the first terminal of the capacitive load and the negative terminal of the DC power supply, said first Zener diode having a threshold value larger than a source voltage of the DC power supply, and said third switching element driven by a first gate signal; and a fourth serial branch circuit having a second Zener diode and a fourth switching element connected in series between the second terminal of the capacitive load and the negative terminal of the DC power supply, said second Zener diode having a threshold value greater than the source voltage of the DC power supply, and said fourth switching element driven by a second gate signal having the opposite phase to the first gate signal.

4. The drive circuit for a capacitive load of claim 3 wherein the above capacitive load is an electrical field light-emitting element.

5. A drive circuit for a capacitive load, comprising:

a first direct-current branch circuit having first and second switching elements serially connected between positive and negative terminals of a DC power supply, said first switching element is driven by a first clock signal, and said second switching element is driven by a first gate signal having a frequency lower than the first clock signal, the first and second switching elements being connected to each other at a first connection point;

a second direct-current branch circuit having third and fourth switching elements connected between the positive and negative terminals of the DC power supply, said third switching element is driven by the second clock signal, and said fourth switching element is driven by a second gate signal having opposite phase to the first gate signal, the third and fourth switching elements being connected to each other at a second connection point;

a coil joined between the first connection point and the second connection point;

a first diode joined between the first connection point and a first terminal of the capacitive load;

a second diode joined between the second connection point and a second terminal of the capacitive load;

a first Zener diode joined between the first terminal of the capacitive load and the negative terminal of the DC power supply, said first Zener diode having a threshold value that is greater than a source voltage of the DC power supply;

a fifth switching element driven by the first gate signal, said fifth switching element being coupled between the first Zener diode and the negative terminal of the DC power supply;

a second Zener diode joined between the second terminal of the capacitive load and the negative terminal of the DC power supply, said second Zener diode having a threshold value that is greater than the source voltage of the DC power supply; and a sixth switching element driven by the second gate signal, said sixth switching element being coupled between the second Zener diode and the negative terminal of the DC power supply.

6. The drive circuit of claim 5 wherein the capacitive load is an electrical field light-emitting element.

7. A drive circuit for driving a capacitive load, comprising:

a DC power supply;

a first branch circuit having first and second serially coupled switching elements coupled between positive and negative terminals of said DC power supply, said first switching element being driven by a first clock signal and said second switching element being driven by a first gate signal;

a second branch circuit having third and fourth serially coupled switching elements coupled between said positive and negative terminals of said DC power supply, said third switching element being driven by a second clock signal and said fourth switching element being driven by a second gate signal;

a coil coupled between a first intermediate node of said first and second switching elements of the first branch circuit and a second intermediate node of said third and fourth switching elements of the second branch circuit;

a first diode coupled between the first intermediate node and a first terminal of the capacitive load;

a second diode coupled between the second intermediate node and a second terminal of the capacitive load;

a fifth switching element coupled between the first terminal of the capacitive load and said negative terminal of the DC power supply, said fifth switching element being driven by said first gate signal; and a sixth switching element coupled between the second terminal of the capacitive load and the negative terminal of the direct current electrical load, said sixth switching element being driven by said second gate signal.

8. The drive circuit of claim 7 wherein said first gate signal has a lower frequency than said first clock signal and a duty cycle of 50%.

9. The drive circuit of claim 7 wherein said second gate signal has an opposite phase than said first gate signal.

10. The drive circuit of claim 7, further including first and second Zener diodes, said first Zener diode being coupled between said first terminal of the capacitive load and said fifth switching element and said second Zener diode being coupled between said second terminal of the capacitive load and said sixth switching element.

11. The drive circuit of claim 10, further comprising an integrated circuit board on which the Zener diodes are formed, wherein said Zener diodes prevent energy from flowing through a parasitic transistor structure of the Zener diodes to the integrated circuit board of said drive circuit.

12. The drive circuit of claim 7 wherein said switching elements are MOSFET transistors.

13. The drive circuit of claim 7 wherein said DC power supply has a voltage of about 3 volts.

14. The drive circuit of claim 7 wherein said first clock signal has an amplitude of about 5 volts, repeating frequency set to about 8 KHz and a duty cycle set to about 3 to 1.

15. The drive circuit of claim 7 wherein said first gate signal has an amplitude of about 5 volts and a repeating frequency set to about 512 Hz.

16. The drive circuit of claim 7 wherein a driving voltage which alternates in polarity is applied to said capacitive load.

17. The drive circuit of claim 16 wherein said driving voltage is about 120 volts.

18. The drive circuit of claim 7 wherein said DC power supply is a low direct current voltage.

19. A process of driving a capacitive load comprising the steps of:

supplying a DC power supply;

pulse charging a first terminal of said capacitive load to a voltage using an inductive coil coupled to the first terminal;

driving said capacitive load using said voltage;

pulse charging a second terminal of said capacitive load to said voltage using the coil which is also coupled to the second terminal; and driving said capacitive load using said voltage.

20. The process of claim 19 wherein said predetermined voltage is about 120 volts.

21. The process of claim 19 wherein said capacitive load is an electrical field light-emitting element.

22. The process of claim 19 wherein the step of pulse charging said first terminal is at an opposite phase and said step of pulse charging said second terminal.

* * * * *